(12) United States Patent
Fukuda et al.

(10) Patent No.: US 11,296,388 B2
(45) Date of Patent: Apr. 5, 2022

(54) SECONDARY BATTERY

(71) Applicant: FDK CORPORATION, Tokyo (JP)

(72) Inventors: Yusuke Fukuda, Tokyo (JP); Hiroyuki Shibaoka, Tokyo (JP); Isao Mugima, Tokyo (JP); Tomomi Yokosawa, Tokyo (JP)

(73) Assignee: FDK CORPORATION, Tokyo (JP)

( * ) Notice: Subject to any disclaimer, the term of this patent is extended or adjusted under 35 U.S.C. 154(b) by 334 days.

(21) Appl. No.: 16/428,934

(22) Filed: May 31, 2019

(65) Prior Publication Data

US 2019/0379019 A1 Dec. 12, 2019

(30) Foreign Application Priority Data

Jun. 11, 2018 (JP) .............................. JP2018-111182

(51) Int. Cl.
*H01M 2/12* (2006.01)
*H01M 2/02* (2006.01)
(Continued)

(52) U.S. Cl.
CPC ..... *H01M 50/342* (2021.01); *H01M 10/0431* (2013.01); *H01M 50/116* (2021.01); *H01M 50/152* (2021.01); *H01M 2200/20* (2013.01)

(58) Field of Classification Search
CPC ........ H01M 10/0431; H01M 2200/20; H01M 50/116; H01M 50/147; H01M 50/152; H01M 50/30; H01M 50/342
See application file for complete search history.

(56) References Cited

U.S. PATENT DOCUMENTS

2010/0112434 A1* 5/2010 Akou ................... H01M 50/538
429/174
2010/0304199 A1* 12/2010 Kozuki ............... H01M 10/286
429/94
(Continued)

FOREIGN PATENT DOCUMENTS

EP 2071649 A1 6/2009
EP 2211400 A1 7/2010
(Continued)

OTHER PUBLICATIONS

Extended European Search Report dated Sep. 23, 2019, received for corresponding European Application No. 19178672.2, 6 pages.

*Primary Examiner* — Stewart A Fraser
*Assistant Examiner* — Brent C Thomas
(74) *Attorney, Agent, or Firm* — Kinney & Lange, P.A.

(57) ABSTRACT

A secondary battery includes an outer can, a sealing body sealing an opening of the outer can, an electrode group housed together with an electrolyte inside the outer can, and a positive electrode current collector arranged between the electrode group and the sealing body. The positive electrode current collector has a current collector center through hole provided at a position facing an electrode group through hole of the electrode group. The sealing body includes a lid plate having an exhaust hole at the center, a valve body arranged at a position closing the exhaust hole from the outside of the lid plate, and a positive electrode terminal electrically connected to the lid plate and housing inside with the valve body pressed toward the lid plate. An inner diameter dimension DC of the current collector center through hole of the positive electrode current collector is equal to or less than an inner diameter dimension DL of the exhaust hole.

1 Claim, 5 Drawing Sheets

(51) Int. Cl.
  *H01M 10/04* (2006.01)
  *H01M 2/04* (2006.01)
  *H01M 50/342* (2021.01)
  *H01M 50/116* (2021.01)
  *H01M 50/152* (2021.01)

(56) References Cited

U.S. PATENT DOCUMENTS

2015/0303445 A1* 10/2015 Ido ................ H01M 10/28
                                                           429/62
2018/0069268 A1*  3/2018 Nakamura .......... H01M 50/538

FOREIGN PATENT DOCUMENTS

| EP | 3293797 A1 | 3/2018 |
| JP | 201143684 A | 5/2001 |
| JP | 2018055812 A | 4/2018 |

* cited by examiner

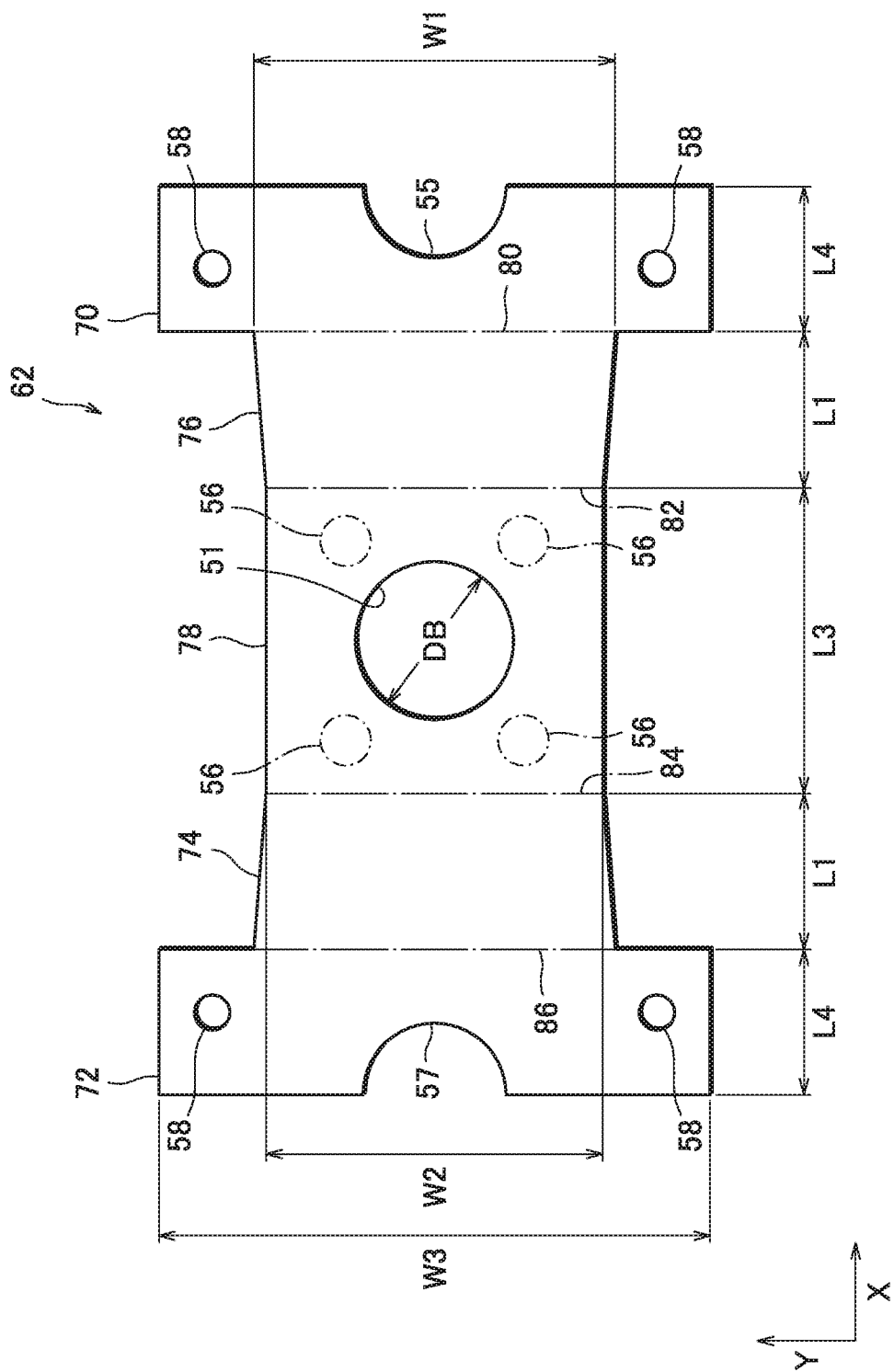

SECONDARY BATTERY

CROSS-REFERENCE TO RELATED APPLICATION

This application claims priority to Japanese Application No. 2018-111182 filed on Jun. 11, 2018, which is hereby incorporated by reference in its entirety.

BACKGROUND

Technical Field

The present disclosure relates to a secondary battery, and more particularly to a secondary battery provided with a safety valve for discharging gas generated in the battery.

Description of the Related Art

Applications for secondary batteries have been expanded and various types of batteries have been developed. As one of such batteries, for example, a sealed alkaline secondary battery as shown below is known.

The sealed alkaline secondary battery includes a bottomed cylindrical outer can, an electrode group housed in the outer can with an alkaline electrolyte, and a sealing body sealing an opening part of the outer can. The sealing body includes a positive electrode terminal.

The procedure of manufacturing the above-described sealed alkaline secondary battery will be described below.

First, a positive electrode and a negative electrode are prepared. The positive electrode is formed with a positive electrode mixture containing a positive electrode active material, a positive electrode additive, a resin binder, and the like held on a positive electrode substrate. The negative electrode is formed with a negative electrode mixture containing a negative electrode active material, a negative electrode additive, a resin binder, and the like held on a negative electrode core body. The prepared positive electrode and negative electrode are stacked with a resin separator sandwiched therebetween, wound around a winding core and wound in a spiral shape (winding step). Thereafter, the winding core is extracted from the spiral center portion, and the portion from which the winding core is extracted becomes a through hole. In this manner, a through hole (hereinafter, referred to as an electrode group through hole) is formed at the center, and an electrode group having a substantially cylindrical shape as a whole can be obtained. A strip-shaped current collecting ribbon formed of a conductive material is electrically connected to the positive electrode of the electrode group.

The obtained electrode group is housed in a bottomed cylindrical outer can. Next, an alkaline electrolyte is injected into the outer can. Now, in the injection step of injecting the alkaline electrolyte into the outer can, the alkaline electrolyte is injected through the electrode group through hole. Thereby, the alkaline electrolyte permeates into the electrode group.

Thereafter, the tip of the current collecting ribbon is welded to the sealing body. Then, the sealing body is caulked and fixed to the portion of the opening of the upper end of the outer can. Thereby, the sealed alkaline secondary battery in which the opening part of the outer can is sealed by the sealing body is obtained.

In the alkaline secondary battery, a high-rate charge and discharge type battery capable of charging and discharging at a higher rate has been developed. As the high-rate charge and discharge type battery, for example, a battery provided with a current collecting plate, a battery provided with a current collecting lead in addition to the current collecting plate, and the like are known.

Now, first, a battery provided with a current collecting plate will be described.

In the battery provided with a current collecting plate, the positive electrode and the negative electrode are disposed to be slightly deviated from each other in the direction along the axis of the electrode group in the winding step in the manufacturing process of the electrode group, and a separator of a predetermined size is disposed at a predetermined position between the positive electrode and the negative electrode. Then, in this state, the positive electrode, the separator and the negative electrode are wound. As a result, the edge part of the positive electrode protrudes in a spiral from one end surface side of the electrode group, and the edge part of the negative electrode protrudes in a spiral from the other end surface side of the electrode group.

A positive electrode current collector formed of a metal plate is welded to the edge part of the protruding positive electrode. On the other hand, a negative electrode current collector formed of a metal plate is welded to the edge part of the protruding negative electrode. Thereby, the positive electrode is electrically connected to the positive electrode current collector in a wide range, and the negative electrode is electrically connected to the negative electrode current collector in a wide range, so that the current collection efficiency is enhanced. As a result, in the battery provided with the current collector as described above, charge and discharge can be performed at a high rate.

Further, a battery provided with a current collecting lead in addition to the current collecting plate will be described. As a battery including such a current collector and a current collecting lead, for example, a battery as shown in Japanese Patent Laid-Open No. 2001-143684 is generally known.

The current collecting lead is a metal tubular body having a rectangular or oval shape in a cross-section, and is arranged between the current collector on the positive electrode side (hereinafter referred to as the positive electrode current collector) and the sealing body, and connects between the sealing body and the positive electrode current collector. As a result, the positive electrode terminal of the sealing body and the positive electrode of the electrode group are electrically connected.

Now, the aspect of the current collecting lead will be described more specifically. In the current collecting lead, a circumference wall portion is welded to the positive electrode current collector and the sealing body, respectively. Here, it is referred to that in a circumference wall of the tubular body, the portion welded to the positive electrode current collector is a bottom wall, the portion welded to the sealing body is a top wall, and the portion extending between the bottom wall and the top wall is a side wall. Shortening the distance between the bottom wall and the top wall as much as possible, that is, shortening the length of the side wall in the direction along the axis of the battery as much as possible, can shorten the current conduction path inside the battery. Moreover, the current collecting lead is formed of a metal plate having a thickness greater than that of the current collecting ribbon described above. From the above, the internal resistance of the battery becomes lower, and charge and discharge can be performed at a higher rate.

In the current collecting plate and the current collecting lead described above, in the injection step of injecting the alkaline electrolyte into the outer can, through holes are provided at positions coaxial with the axis of the electrode group through hole, respectively, so that the alkaline electrolyte is smoothly introduced into the electrode group through hole of the electrode group. Here, the through hole provided in the positive electrode current collector is referred to as a current collector center through hole, the through hole provided in the top wall of the current collecting lead is referred to as a top wall through hole, and the through hole provided in the bottom wall of the current collecting lead is referred to as a bottom wall through hole.

In the sealed alkaline secondary battery, when it is charged by mistaking the positive electrode and negative electrode (erroneous charging), when it is overcharged, when it is externally short-circuited, when it is accidentally dropped into a fire, and the like, a gas is abnormally generated in the battery to increase the pressure in the battery, and accordingly the outer can may be deformed to rupture the battery. Therefore, to prevent such a battery rupture, in a sealed alkaline secondary battery, a safety valve is provided which opens when the pressure of the gas generated in the battery exceeds a certain value and releases the gas to the outside. Such a safety valve is usually arranged in the sealing body. Here, the structure of the sealing body having the safety valve is as follows, for example.

The sealing body is a lid plate having an exhaust hole, and includes the lid plate fitted to the opening of the outer can, a valve body disposed to close the exhaust hole, and a positive electrode terminal for housing the valve body.

The lid plate is a metal disk that matches the opening part of the outer can. The exhaust hole is provided in the center portion of the lid plate.

The positive electrode terminal includes, for example, a cylindrical circumference wall, an opening positioned at one end of the circumference wall, a flange provided at the periphery of the opening, and an end wall positioned at the other end opposite to the opening. The portion of the flange of the positive electrode terminal is welded to the lid plate with the valve body housed inside. A gas venting hole is provided on the circumference wall of the positive electrode terminal.

The valve body described above is formed of an elastic material, for example, a rubber-based material, and its shape is, for example, a cylindrical shape. The valve body is housed inside the positive electrode terminal, is compressed between the end wall of the positive electrode terminal and the above-mentioned lid plate, closes the opening end of the exhaust hole to a predetermined pressure, and ensures sealability of the battery.

In the above-described valve body, when a gas is abnormally generated in the battery, and the pressure of the gas in the battery rises to exceed a predetermined pressure, the valve body is elastically deformed by the pressure of the gas, and the exhaust hole of the lid plate opens. Thereby, the gas in the battery is released to the outside through the exhaust hole and the gas venting hole of the positive electrode terminal, and the battery is prevented from rupturing. Thereafter, as the pressure of the gas in the battery drops, the valve body returns to its original shape and closes the exhaust hole of the lid plate, and the battery is sealed again. Now, in the current collecting lead as described above, the top wall is welded to the lid plate of the sealing body. The top wall through hole provided in the top wall is positioned at a portion facing the exhaust hole of the lid plate, and therefore, when the valve body opens the exhaust hole of the lid plate, it also functions not to inhibit the flow of the gas flowing through the exhaust hole.

When the sealed alkaline secondary battery is erroneously charged, when it is overcharged, when it is externally short-circuited, when it is accidentally dropped into a fire, and the like, a gas is abnormally generated in the battery, and the battery becomes hot. Here, when the battery temperature is high enough to melt the resin, the resin separator melts, or the resin component contained in the positive electrode mixture and the negative electrode mixture melts. Thus, when the resin melts, the melt of the resin is formed, and the melt may be separated from the electrode group to be fragmented. Such fragments of the melt are likely to be formed mainly in the electrode group through hole of the electrode group. When the internal pressure of the battery rises, and the valve body is deformed to cause the safety valve to be about to open, the fragments of the melt formed in the electrode group through hole are drawn to the portion of the exhaust hole of the lid plate, together with the released gas. That is, the safety valve being about to open causes the flow of gas from the inside of the battery in a higher-pressure state to the outside of the battery which is at a lower-pressure state than the inside of the battery. Together with the flow, the fragments of the melt in the electrode group through hole of the electrode group move in the electrode group through hole, jump out from the electrode group through hole, and collect in the portion of the exhaust hole of the lid plate. As a result, the fragments of the melt may block the exhaust hole of the lid plate. When the exhaust hole is blocked, the safety valve does not function, so that even if the internal pressure of the battery rises, the gas cannot be discharged to the outside. As a result, the battery may rupture.

For this reason, it is desired to develop a highly safe secondary battery that even if the battery becomes hot and the resin component inside is melted to form a melt, the operation of the safety valve is not inhibited, and the gas can be reliably released to the outside.

SUMMARY

According to the present disclosure, there is provided a secondary battery including an outer can also serving as a terminal of one electrode, and having an opening, a sealing body sealing the opening of the outer can, and an inner housing component housed with an electrolyte inside the outer can, wherein the sealing body includes a lid plate fitted to the opening, the lid plate having an exhaust hole at a center, a valve body arranged at a position closing the exhaust hole from the outside of the lid plate, and a cap member also serving as a terminal of the other electrode and electrically connected to the lid plate, the cap member housing the valve body inside with the valve body pressed toward the lid plate, and the inner housing component includes a specific through hole having an inner diameter dimension equal to or less than an inner diameter dimension of the exhaust hole at a position facing the exhaust hole.

BRIEF DESCRIPTION OF THE DRAWINGS

The present disclosure will become more fully understood from the detailed description given hereinafter and the accompanying drawings which are given by way of illustration only, and thus, are not limitative of the present disclosure, and wherein:

FIG. 8 is a plan view showing an intermediate product of the current collecting lead.

DETAILED DESCRIPTION

First Embodiment

As a secondary battery according to the present disclosure, an FA sized cylindrical nickel-hydrogen secondary battery (hereinafter referred to as a battery) 101 will be described below as an example with reference to the drawings.

The battery 101 includes an outer can 2 having a bottomed cylindrical shape with an upper end open, the outer can 2 having conductivity, and a bottom wall thereof functions as a negative electrode terminal. In the outer can 2, an electrode group 4 constituting a part of the inner housing component is housed together with a predetermined amount of alkaline electrolyte (which is not shown).

Figure 1:
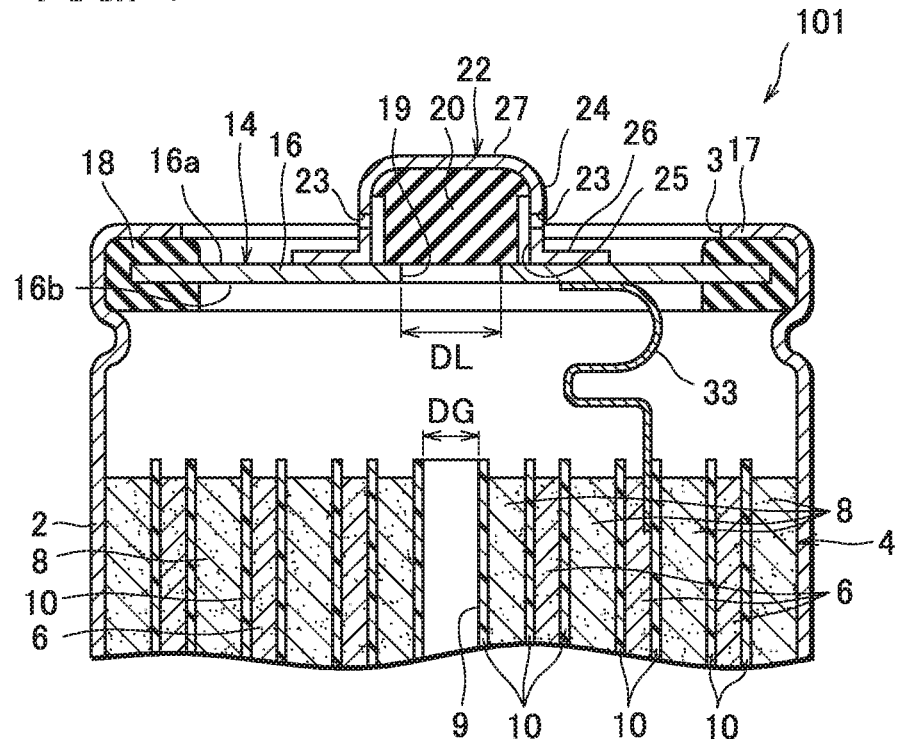
FIG. 1 is a partial cross-sectional view showing a nickel-hydrogen secondary battery according to a first embodiment of the present disclosure.

As shown in FIG. 1, an opening 3 of the outer can 2 is closed by a sealing body 14. The sealing body 14 includes a conductive disk-shaped lid plate 16, a valve body 20 arranged on the lid plate 16, and a positive electrode terminal (cap member) 22 similarly arranged on the lid plate 16.

A ring-shaped insulating gasket 18 is disposed on the outer periphery of the lid plate 16 to surround the lid plate 16. The insulating gasket 18 and the lid plate 16 are fixed to an opening edge 17 of the outer can 2 by caulking the opening edge 17 of the outer can 2. That is, the lid plate 16 and the insulating gasket 18 cooperate with each other to seal the opening 3 of the outer can 2.

Here, the lid plate 16 has an exhaust hole 19 at the center. A rubber valve body 20 is arranged on an outer surface 16a of the lid plate 16 at a position closing the exhaust hole 19. Further, the positive electrode terminal 22 is electrically connected on the outer surface 16a of the lid plate 16 to cover the valve body 20.

The positive electrode terminal 22 includes a cylindrical circumference wall 24, an opening 25 positioned at one end of the circumference wall 24, a flange 26 provided at the periphery of the opening 25, and an end wall 27 positioned at the other end opposite to the opening 25. The positive electrode terminal 22 presses the valve body 20 toward the lid plate 16. The positive electrode terminal 22 also has a gas venting hole 23 in the circumference wall 24.

At normal times, the exhaust hole 19 is airtightly closed by the valve body 20. On the other hand, when a gas is generated inside the outer can 2 and the pressure of the gas increases, the valve body 20 is compressed by the pressure of the gas, and the exhaust hole 19 is opened. As a result, the gas is released from the inside of the outer can 2 through the exhaust hole 19 and the gas venting hole 23 of the positive electrode terminal 22 to the outside. That is, the exhaust hole 19, the valve body 20 and the gas venting hole 23 of the positive electrode terminal 22 form a safety valve for the battery 101.

The electrode group 4 includes a positive electrode 6, a negative electrode 8, and a separator 10, each having a strip shape, and these are wound in a spiral shape with the separator 10 sandwiched between the positive electrode 6 and the negative electrode 8. That is, the positive electrode 6 and the negative electrode 8 are stacked each other via the separator 10. Such an electrode group 4 has a cylindrical shape as a whole. The outermost periphery of the electrode group 4 is formed by a part (the outermost peripheral portion) of the negative electrode 8 and is in contact with the inner periphery wall of the outer can 2. That is, the negative electrode 8 and the outer can 2 are electrically connected to each other.

Further, in the outer can 2, a current collecting ribbon 33 is disposed between a part of the electrode group 4 and the lid plate 16. Specifically, one end of the current collecting ribbon 33 is connected to the positive electrode 6, and the other end is connected to the lid plate 16. Therefore, the positive electrode terminal 22 and the positive electrode 6 are electrically connected to each other via the current collecting ribbon 33 and the lid plate 16.

The negative electrode 8 has a strip-shaped conductive negative electrode core body, and the negative electrode mixture is held on the negative electrode core body.

The negative electrode core body is a strip-shaped metal material, and a large number of through holes (which are not shown) penetrating in the thickness direction are provided. As such a negative electrode core body, for example, a punching metal sheet can be used.

The negative electrode mixture is not only filled in the through holes of the negative electrode core body, but also held in layers on both surfaces of the negative electrode core body.

The negative electrode mixture contains particles of a hydrogen storage alloy, a conductive material, a binder, and the like. Here, the hydrogen storage alloy is an alloy capable of storing and releasing hydrogen which is a negative electrode active material, and the hydrogen storage alloy generally used in a nickel-hydrogen secondary battery is suitably used. The above-described binder functions to bind the particles of the hydrogen storage alloy and the conductive material to each other and to bind the negative electrode mixture to the negative electrode core body. Here, as the conductive material, those generally used in nickel-hydrogen secondary batteries are suitably used. Further, although the binder is not particularly limited if it is generally used for the negative electrode of a nickel-hydrogen secondary battery, for example, a resin-based material is used. Specifically, hydrophilic polymers, hydrophobic polymers, and resin-based materials such as carboxymethyl cellulose can be used.

The negative electrode 8 can be manufactured, for example, as follows.

First, a hydrogen storage alloy powder which is an aggregate of hydrogen storage alloy particles, a conductive material, a binder and water are kneaded to prepare a paste of a negative electrode mixture. The obtained paste of the negative electrode mixture is applied to the negative electrode core body and dried. After drying, the negative electrode core body on which the negative electrode mixture containing the hydrogen storage alloy particles and the like is attached is subjected to rolling to increase the packing density of the hydrogen storage alloy, and then cut into a predetermined shape. Thereby, the negative electrode 8 is obtained.

Next, the positive electrode 6 will be described.

The positive electrode 6 includes a conductive positive electrode substrate and a positive electrode mixture held on the positive electrode substrate. Specifically, the positive electrode substrate has a porous structure having a large number of pores, and the positive electrode mixture is held in the pores and on the surface of the positive electrode substrate.

As the positive electrode substrate, for example, foamed nickel can be used.

The positive electrode mixture contains nickel hydroxide particles as positive electrode active material particles, a cobalt compound as a conductive material, a binder, and the like. The above-described binder functions to bind the nickel hydroxide particles and the conductive material to each other and to bind the nickel hydroxide particles and the conductive material to the positive electrode substrate. Here, the binder is not particularly limited if it is generally used for the positive electrode of a nickel-hydrogen secondary battery, but for example, a resin-based material can be used. Specifically, resin-based materials such as carboxymethyl cellulose, methyl cellulose, PTFE (polytetrafluoroethylene) dispersion, HPC (hydroxypropyl cellulose) dispersion, and the like can be used.

The positive electrode 6 can be manufactured, for example, as follows.

First, a positive electrode mixture slurry including a positive electrode active material powder which is an aggregate of positive electrode active material particles (nickel hydroxide particles), a conductive material, water and a binder is prepared. The obtained positive electrode mixture slurry is, for example, filled in foamed nickel and dried. Thereafter, the foamed nickel filled with the nickel hydroxide particles and the like is subjected to rolling and cutting. Thereby, the positive electrode 6 holding the positive electrode mixture is obtained. The current collecting ribbon 33 is welded to a predetermined position of the obtained positive electrode 6.

Next, as the separator 10, a strip made of a resin material can be used. For example, a strip of a polyamide fiber non-woven fabric to which a hydrophilic functional group is imparted, or a polyolefin fiber non-woven fabric such as polyethylene or polypropylene to which a hydrophilic functional group is imparted can be used.

The positive electrode 6 and the negative electrode 8 manufactured as described above are wound in a spiral shape with the above-described separator 10 interposed. Thereby, the electrode group 4 is formed.

The electrode group 4 is formed by winding the positive electrode 6, the negative electrode 8 and the separator 10 described above with a winding core having a predetermined outer diameter dimension, and after the winding operation, the winding core is extracted, thereby, in the center part of the electrode group 4, an electrode group through hole 9 penetrating the center part is formed.

The obtained electrode group 4 is housed in the outer can 2. Subsequently, a predetermined amount of alkaline electrolyte is injected into the outer can 2. The alkaline electrolyte is impregnated into the electrode group 4 and advances the charge and discharge reaction between the positive electrode 6 and the negative electrode 8. It is preferable that as the alkaline electrolyte, an alkaline electrolyte containing at least one of KOH, NaOH and LiOH as a solute is used.

Next, the other end of the current collecting ribbon 33 is welded to a predetermined position of the lid plate 16, and then the sealing body 14 is disposed at the upper end opening part of the outer can 2 housing the electrode group 4 and the alkaline electrolyte with the insulating gasket 18 arranged at the outer peripheral edge of the lid plate 16. Thereafter, the opening edge 17 of the outer can 2 is caulked to seal the opening 3 of the outer can 2. Thus, the battery 101 according to the first embodiment sealed with the lid plate 16 provided with the positive electrode terminal 22 is obtained.

In the battery 101 according to the first embodiment, as shown in FIG. 1, the electrode group 4 constituting a part of the inner housing component is housed in the outer can 2, and the electrode group 4 has the electrode group through hole 9 as a specific through hole at a position facing the exhaust hole 19 of the sealing body 14. The inner diameter dimension (DG) of the electrode group through hole 9 is set equal to or less than the inner diameter dimension (DL) of the exhaust hole 19 (DL≥DG). That is, the electrode group through hole 9 has an inner diameter dimension equal to or smaller than that of the exhaust hole 19.

Here, when the obtained battery 101 is overcharged or the like, when it is externally short-circuited, when it is accidentally dropped into a fire, and the like, a gas is abnormally generated in the battery 101 and the battery 101 becomes hot. Then, the resin component contained in the electrode group 4 may be melted to form the melt of the resin component. The melt is mainly formed in the electrode group through hole 9 of the electrode group 4. Further, in the battery in such a situation, the exhaust hole 19 being about to open with the operation of the safety valve causes the flow of gas from the inside of the high-pressure battery to the outside of the battery at a lower pressure than the inside of the battery. The fragments of the melt ride on the flow of the gas, move in the electrode group through hole 9, jump out from the electrode group through hole 9, and travel to the exhaust hole 19 of the lid plate 16. Then, the fragments of the melt adhere to the portion of the exhaust hole 19 to block the exhaust hole 19, which may make the safety valve impossible to operate. However, in the battery 101 according to the first embodiment as described above, the inner diameter of the electrode group through hole 9 as the specific through hole in the electrode group 4 constituting a part of the inner housing component is equal to or less than the inner diameter of the exhaust hole 19, so that the fragments of the melt passing through the electrode group through hole 9 are prevented from spreading in a range wider than the inner diameter of the electrode group through hole 9. For this reason, it is suppressed that the fragments of the melt cover the whole of the exhaust hole 19. That is, blocking of the exhaust hole 19 with the fragments of the melt is prevented. As a result, the inactivation of the safety valve can be avoided, and the safety of the battery 101 can be improved.

As described above, the battery of the first embodiment of the present disclosure is a secondary battery having higher safety than the conventional one.

Second Embodiment

A battery 102 according to the second embodiment will be described with reference to FIG. 2 and FIG. 3. In the description of the battery 102 according to the second embodiment, about the same composition as the battery 101 according to the first embodiment described above, the same reference symbol as the battery 101 according to the first embodiment is attached, and the detailed description thereof is omitted. Portions different from the battery 101 according to the first embodiment will be described in detail.

In an electrode group 104 included in the battery 102, the edge part of a positive electrode 106 is spirally exposed from one end surface, and the edge part of a negative electrode 108 is spirally exposed from the other end surface. Here, assuming that the edge part of the exposed positive electrode 106 is a positive electrode connection edge part 32, and the edge part of the exposed negative electrode 108 is a negative electrode connection edge part (which is not shown). At the exposed positive electrode connection edge part 32 and the negative electrode connection edge part, a positive electrode current collector 28 constituting a part of an inner housing component described later and a negative electrode current collector (which is not shown) also constituting a part of the inner housing component are welded, respectively.

The negative electrode 108 can be manufactured, for example, as follows.

First, a hydrogen storage alloy powder which is an aggregate of hydrogen storage alloy particles, a conductive material, a binder and water are kneaded to prepare a paste of a negative electrode mixture. The obtained paste of the negative electrode mixture is applied to the negative electrode core body and dried. After drying, the negative electrode core body on which the negative electrode mixture containing the hydrogen storage alloy particles and the like is attached is subjected to rolling and cutting. Thereby, an intermediate product of the negative electrode is obtained. The intermediate product of the negative electrode has a rectangular shape as a whole. Then, removal of the negative electrode mixture is performed from a predetermined edge part to be a negative electrode connection edge part in the intermediate product of the negative electrode. Thereby, the predetermined edge part is the negative electrode connection edge part in which the negative electrode core body is exposed. Thus, the negative electrode 108 having the negative electrode connection edge part is obtained. Here, the method of removing the negative electrode mixture is not particularly limited, but for example, removal by applying ultrasonic vibration is suitably performed. In the region other than the negative electrode connection edge part, the negative electrode mixture is still held.

The positive electrode 106 can be manufactured, for example, as follows.

First, a positive electrode mixture slurry including a positive electrode active material powder which is an aggregate of positive electrode active material particles (nickel hydroxide particles), a conductive material, water and a binder is prepared. The obtained positive electrode mixture slurry is, for example, filled in foamed nickel and dried. Thereafter, the foamed nickel filled with the nickel hydroxide particles and the like is subjected to rolling and cutting. Thereby, an intermediate product of the positive electrode is obtained. The intermediate product of this positive electrode has a rectangular shape as a whole. Then, the positive electrode mixture is removed from a predetermined edge part to be the positive electrode connection edge part 32 in the intermediate product of the positive electrode, and the positive electrode substrate is exposed. Then, the edge part from which the positive electrode mixture has been removed is compressed in the thickness direction of the intermediate product of the positive electrode to form the positive electrode connection edge part 32. Compression processing in this way causes the positive electrode substrate to be in a dense state, so that the positive electrode connection edge part 32 is easy to weld. In addition, joining a thin plate of Ni plated steel to the positive electrode connection edge part 32 may make it easier to weld the positive electrode connection edge part 32. In this way, the positive electrode 106 having the positive electrode connection edge part 32 is obtained. Here, the method of removing the positive electrode mixture is not particularly limited, but for example, a method of removing by applying ultrasonic vibration is suitably used. The region other than the positive electrode connection edge part 32 is still filled with the positive electrode mixture.

The positive electrode 106 and the negative electrode 108 manufactured as described above are wound in a spiral shape with the separator 10 interposed therebetween, thereby the electrode group 104 is formed. Specifically, during winding, the positive electrode 106 and the negative electrode 108 are disposed to be slightly deviated from each other in the direction along the axial direction of the electrode group 104, and the separator 10 of a predetermined size is disposed at a predetermined position between the positive electrode 106 and the negative electrode 108. In this state, the winding operation is performed. As a result, a cylindrical electrode group 104 is obtained. As for an aspect of the obtained electrode group 104, in one end side of the electrode group 104, the positive electrode connection edge part 32 of the positive electrode 106 protrudes from the adjacent negative electrode 108 via the separator 10. In the other end side of the electrode group 104, the negative electrode connection edge part of the negative electrode 108 protrudes from the adjacent positive electrode 106 via the separator 10.

The electrode group 104 has a cylindrical shape having an electrode group through hole 9 as a whole. Then, in the electrode group 104, the positive electrode current collector 28 is connected to the positive electrode connection edge part 32 forming one end part of the cylindrical shape of the electrode group 104, and the negative electrode current collector is connected to the negative electrode connection edge part forming the other end part of the cylindrical shape of the electrode group 104.

The above-mentioned negative electrode current collector is not particularly limited, and for example, it is preferable to use a disk-shaped metal plate conventionally used. The prepared negative electrode current collector is welded to the negative electrode connection edge part of the other end side of the electrode group 104.

Next, the positive electrode current collector 28 will be described.

The positive electrode current collector 28 is a plate-like body formed of a conductive material, and the shape in a plan view is not particularly limited, and any shape such as a disk shape or a polygonal shape can be adopted. Further, the size of the positive electrode current collector 28 is set to a size smaller than the outer diameter dimension of the electrode group 104 and capable of covering the positive electrode connection edge part 32 of the positive electrode 106 protruding from one end side of the electrode group 104.

Figure 3:
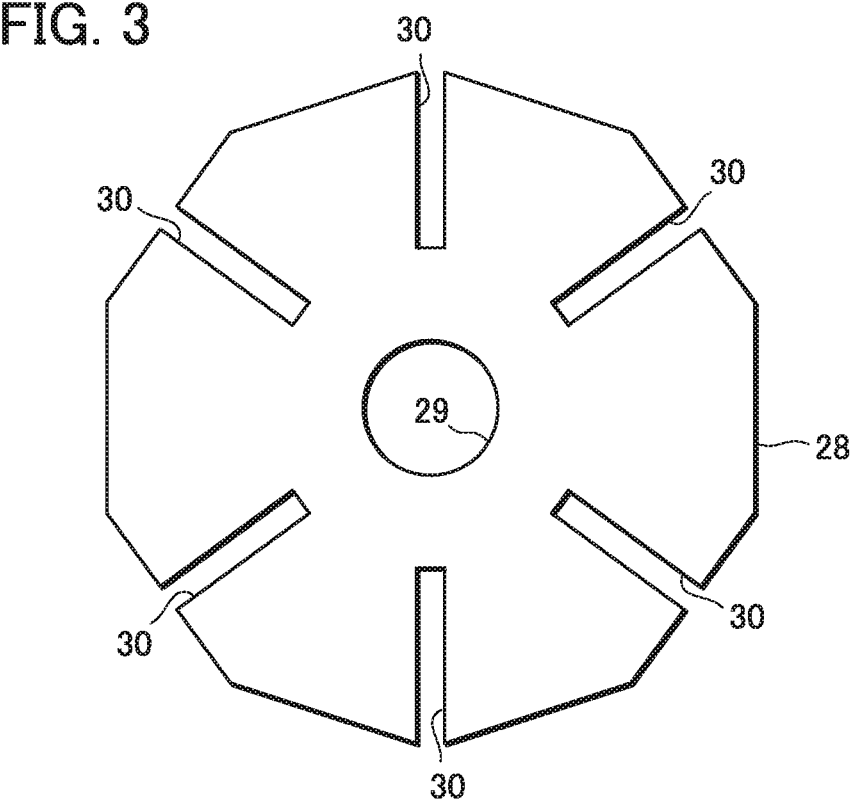
FIG. 3 is a plan view showing a positive electrode current collector according to the second embodiment of the present disclosure.

In the present embodiment, as shown in FIG. 3, a plate material having a decagon shape in a plan view is used. Specifically, the positive electrode current collector 28 is a thin plate made of a decagon-shaped Ni-plated steel as a whole, and includes a circular current collector center through hole 29 at the center and six slits 30 radially extending to surround the current collector center through hole 29. It is preferable that the slits 30 are formed by punching, which produces a protrusion (burr) extending downward (on the side of the electrode group 104) at the portion of the edge of the slits 30.

Figure 2:
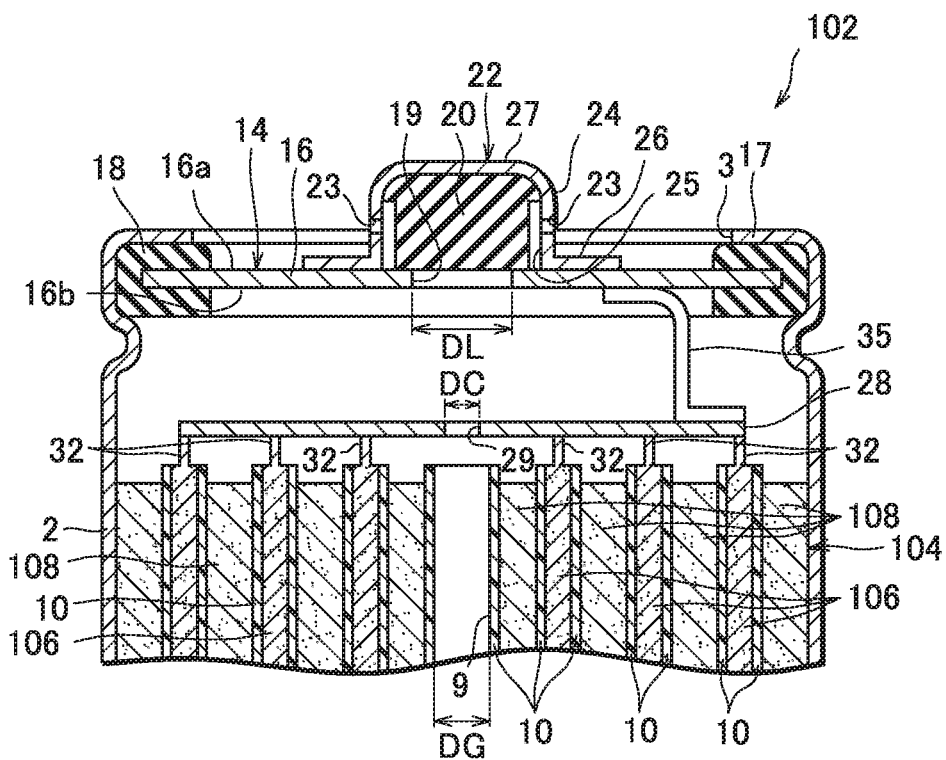
FIG. 2 is a partial cross-sectional view showing a nickel-hydrogen secondary battery according to a second embodiment of the present disclosure.

In the battery 102, as shown in FIG. 2, a current collection tab 35 is interposed between the positive electrode current collector 28 and the sealing body 14, and the current collection tab 35 electrically connects the positive electrode current collector 28 connected to the positive electrode 106 of the electrode group 104, and the sealing body 14 having the positive electrode terminal 22.

With the current collection tab 35 used in the present embodiment formed of a thin metal plate, one end of which is connected to the lid plate 16 of the sealing body 14, and the other end of which is connected to the positive electrode current collector 28.

Next, an example of an assembly procedure of the battery 102 will be described. First, the electrode group 104 as described above is prepared. Then, after the negative electrode current collector is joined to the other end side of the electrode group 104, the electrode group 104 is housed in the outer can 2. Then, the negative electrode current collector is resistance-welded to the bottom wall of the outer can 2.

Next, the positive electrode current collector 28 is mounted on one end side of the electrode group 104, and the positive electrode connection edge part 32 and the positive electrode current collector 28 of the electrode group 104 are resistance-welded. At this time, a current is concentrated at a portion where the burrs of the slits 30 of the positive electrode current collector 28 and the positive electrode connection edge part 32 contact to form a welded part, and the positive electrode connection edge part 32 and the positive electrode current collector 28 of the positive electrode 106 are welded.

Next, after resistance-welding an inner surface 16b of the lid plate 16 of the sealing body 14 and one end of the current collection tab 35, the other end of the current collection tab 35 is resistance-welded to a predetermined position of the positive electrode current collector 28.

Next, after a predetermined amount of alkaline electrolyte is injected into the outer can 2, the sealing body 14 with the insulating gasket 18 arranged at the outer peripheral edge of the lid plate 16 is disposed at the upper end opening part of the outer can 2. Thereafter, the opening edge 17 of the outer can 2 is caulked to seal the opening 3 of the outer can 2. Thus, the battery 102 is formed.

In the battery 102 according to the second embodiment, as shown in FIG. 2, the positive electrode current collector 28 that constitutes a part of the inner housing component is housed in the outer can 2, and the positive electrode current collector 28 has the current collector center through hole 29 as the specific through hole at a position facing the exhaust hole 19 of the sealing body 14. The inner diameter dimension (DC) of the current collector center through hole 29 is set equal to or less than the inner diameter dimension (DL) of the exhaust hole 19 ($DL \geq DC$). That is, the current collector center through hole 29 has an inner diameter dimension equal to or smaller than that of the exhaust hole 19.

In the battery 102 according to the second embodiment, the size of the inner diameter dimension (DG) of the electrode group through hole 9 of the electrode group 104 which is not the specific through hole is not particularly limited.

Now, when the obtained battery 102 is overcharged or the like, when it is externally short-circuited, when it is accidentally dropped into a fire, and the like, a gas is abnormally generated in the battery 102 and the battery 102 becomes hot. Then, the resin component contained in the electrode group 104 may be melted to form the melt of the resin component. The melt is mainly formed in the electrode group through hole 9 of the electrode group 104. Further, in the battery in such a situation, the exhaust hole 19 being about to open with the operation of the safety valve causes the flow of gas from the inside of the high-pressure battery to the outside of the battery at a lower pressure than the inside of the battery. The fragments of the melt ride on the flow of the gas, move in the electrode group through hole 9, jump out from the electrode group through hole 9, and travel to the exhaust hole 19 of the lid plate 16. Then, the fragments of the melt adhere to the portion of the exhaust hole 19 to block the exhaust hole 19, which may make the safety valve impossible to operate. However, in the battery 102 according to the second embodiment as described above, the inner diameter of the current collector center through hole 29 as the specific through hole in the positive electrode current collector 28 constituting a part of the inner housing component is equal to or less than the inner diameter of the exhaust hole 19, so that the fragments of the melt passing through the current collector center through hole 29 are prevented from spreading in a range wider than the inner diameter of the current collector center through hole 29. For this reason, it is suppressed that the fragments of the melt cover the whole of the exhaust hole 19. That is, blocking of the exhaust hole 19 with the fragments of the melt is prevented. As a result, the inactivation of the safety valve can be avoided, and the safety of the battery 102 can be improved.

As described above, the battery of the second embodiment of the present disclosure is a secondary battery having higher safety than the conventional one.

In the battery 102 according to the second embodiment, the electrode group through hole 9 of the electrode group 104 may be the specific through hole. In this case, it is preferable that the relation between the inner diameter dimension (DL) of the exhaust hole 19, the inner diameter dimension (DC) of the current collector center through hole 29, and the inner diameter dimension (DG) of the electrode group through hole 9 is $DL \geq DC \geq DG$.

Third Embodiment

A battery 103 according to the third embodiment will be described with reference to FIG. 4 to FIG. 8. In the description of the battery 103 according to the third embodiment, about the same configuration as the battery 101 according to the first embodiment and the battery 102 according to the second embodiment already described, the same reference symbols as the battery 101 according to the first embodiment and the battery 102 according to the second embodiment are attached, and the detailed description thereof is omitted. Portions different from the battery 101 according to the first embodiment and the battery 102 according to the second embodiment will be described in detail.

First, a positive electrode current collector 128 will be described.

Figure 5:
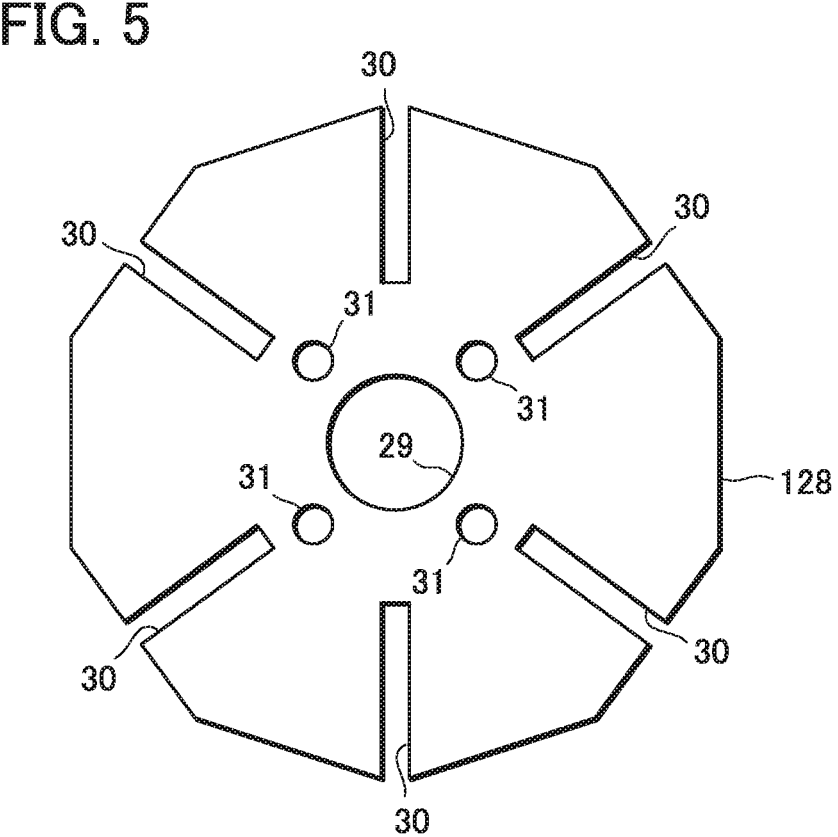
FIG. 5 is a plan view showing a positive electrode current collector according to the third embodiment of the present disclosure.

The positive electrode current collector 128 of this embodiment is, as shown in FIG. 5, the same aspect as the positive electrode current collector 28 of the second embodiment, except that at a predetermined position around the current collector center through hole 29, current collector protrusions 31 protruding to the side opposite to the side of the electrode group 104 are provided, by punch press processing. Although the number of the current collector protrusions 31 is not particularly limited, for example, it is preferable to provide four as shown in FIG. 5.

Figure 4:
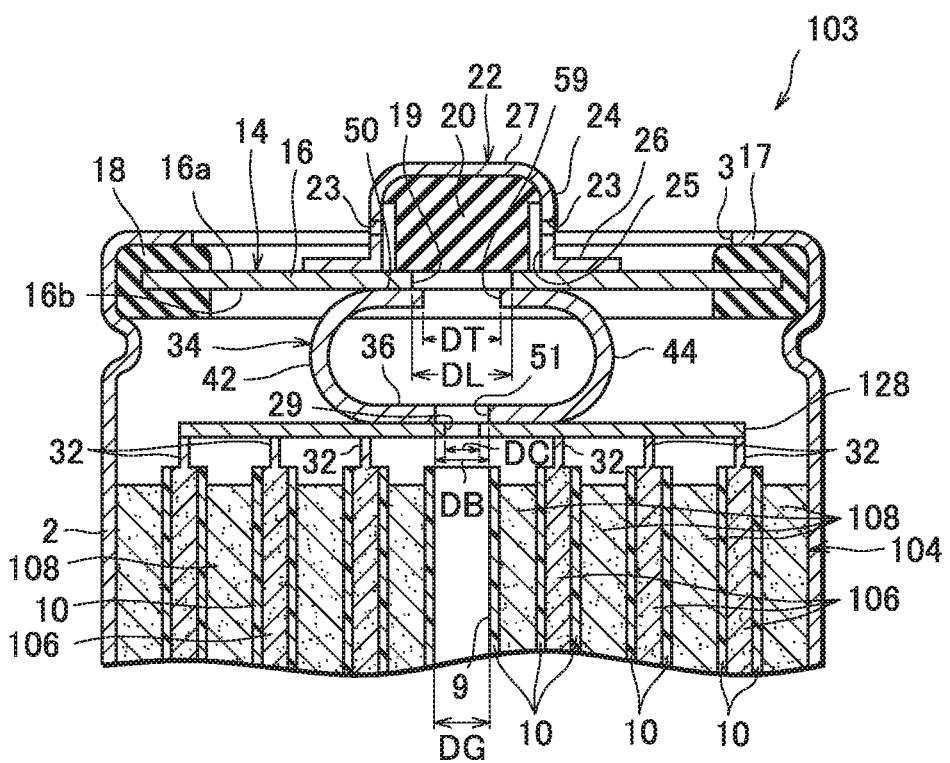
FIG. 4 is a partial cross-sectional view showing a nickel-hydrogen secondary battery according to a third embodiment of the present disclosure.

In the battery 103, as shown in FIG. 4, the current collecting lead 34 is interposed between the positive electrode current collector 128 and the sealing body 14, and the current collecting lead 34 electrically connects the positive electrode current collector 128 connected to the positive electrode 106 of the electrode group 104 and the sealing body 14 having the positive electrode terminal 22.

The current collecting lead 34 used in the present embodiment includes, as is apparent from FIG. 4, a top wall 50 connected to the lid plate 16 of the sealing body 14, a bottom wall 36 connected to the positive electrode current collector 128, and a pair of side walls 42, 44 respectively present between edges 46, 48 on both sides of the top wall 50 and edges 38, 40 on both sides of the bottom wall 36.

Figure 6:
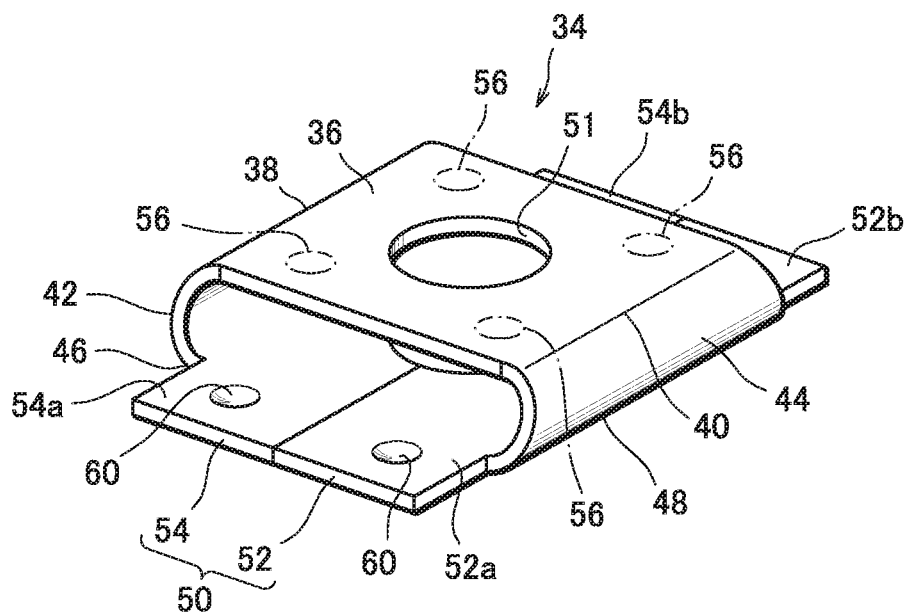
FIG. 6 is a perspective view showing a current collecting lead with a bottom wall side up.

The current collecting lead 34 will be described with reference to FIG. 6 and FIG. 7. FIG. 6 shows with the bottom wall 36 upward and the top wall 50 downward, and FIG. 7 shows with the bottom wall 36 downward and the top wall 50 upward.

The bottom wall 36 has a rectangular shape, as is apparent from FIG. 6, and a circular bottom wall through hole 51 is provided at the center. The bottom wall through hole 51 is provided to prevent the alkaline electrolyte from being accumulated on the bottom wall 36 and to allow the alkaline electrolyte to smoothly spread to the electrode group 104. Here, a virtual circle indicated by reference numeral 56 indicates a welding schedule place which is the welded part when resistance-welding is performed. In the present embodiment, there are four welding schedule places (bottom wall welding schedule part) 56 on the bottom wall 36, which are positioned respectively near four corner parts on the bottom wall 36 to surround the bottom wall through hole 51.

Figure 7:
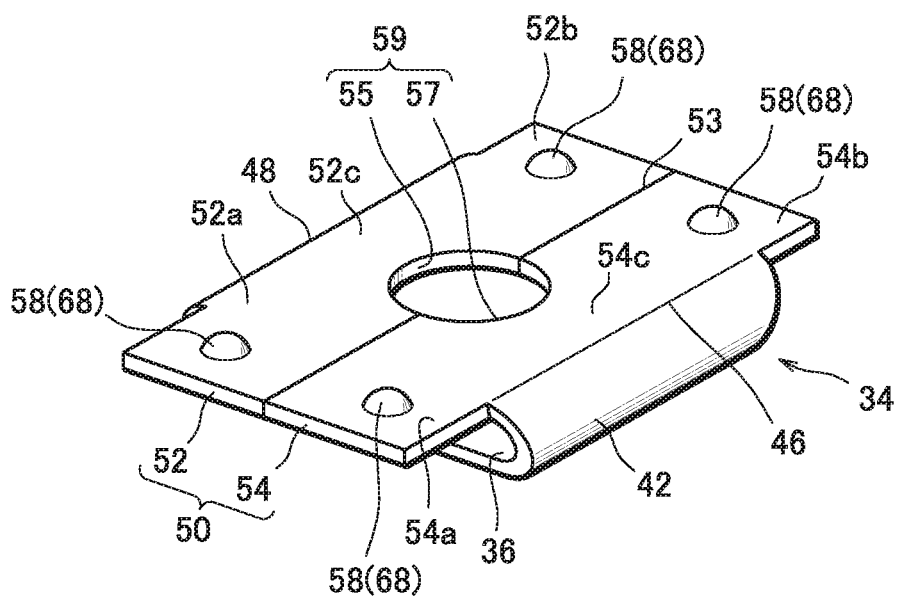
FIG. 7 is a perspective view showing the current collecting lead with a top wall side up.

The top wall 50 is positioned in a position facing the bottom wall 36, as is apparent from FIG. 7, and has a rectangular shape as a whole. Specifically, the top wall 50 is formed of two portions connected by a connecting part 53 extending along the long side direction at the center in the short side direction. That is, the top wall 50 is formed by abutting one divided first half body part 52 and the other divided second half body part 54.

The first half body part 52 and the second half body part 54 includes, specifically, faced parts 52c and 54c facing the bottom wall 36, and extension parts 52a, 52b, 54a and 54b extending in the longitudinal direction of the top wall 50 from the faced parts 52c and 54c.

At the center of the faced part 52c of the first half body part 52, a semicircular first semicircular notch 55 facing the connecting part 53 described above is provided. Further, a semicircular second semicircular notch 57 facing the above-described connecting part 53 is provided at the center of the faced part 54c of the second half body part 54. The first semicircular notch 55 and the second semicircular notch 57 are positioned facing each other to form a circular top wall through hole 59 as a whole. The top wall through hole 59 faces the exhaust hole 19 of the lid plate 16 when the current collecting lead 34 is joined to the sealing body 14.

The extension parts 52a, 52b, 54a and 54b are provided with lead protrusions 58 protruding toward the side of the sealing body 14 (see FIG. 7). The lead protrusion 58 is used as a portion to concentrate the welding current when resistance-welding is performed. That is, in the resistance-welding, the heat generated by applying a large current to the lead protrusion 58 in a concentrated manner by pressurizing the lead protrusion 58 causes the lead protrusion 58 to melt, and welding of members each other is performed. The lead protrusion 58 is a welding schedule place (top wall welding schedule part) 68 on the top wall 50.

The lead protrusion 58 is formed, for example, by punch press processing. The reference numeral 60 in FIG. 6 indicates a recess formed on the back side of the lead protrusion 58 when the lead protrusion 58 is provided on the extension parts 52a, 52b, 54a and 54b.

The extension parts 52a, 52b, 54a and 54b extend outward from the faced parts 52c and 54c facing the bottom wall 36 and avoid overlapping with the bottom wall 36. For this reason, when the current collecting lead 34 is resistance-welded to the sealing body 14, the electrode bar of the resistance-welding machine can be brought into contact with the extension parts 52a, 52b, 54a and 54b without interference with the bottom wall 36. In addition, the extending outward of the extension parts 52a, 52b, 54a and 54b from the faced parts 52c and 54c facing the bottom wall 36 functions to enhance the stability of the current collecting lead 34 when the current collecting lead 34 is joined to the sealing body 14.

Side walls 42 and 44 extend from the edges 38 and 40 on both sides of the bottom wall 36 to the edges 46 and 48 on both sides of the top wall 50, as shown in FIG. 6. The shape of the side walls 42 and 44 in a plan view is not particularly limited and, for example, any shape, such as rectangular shape or trapezoidal shape, can be employed.

The above-described current collecting lead 34 can be manufactured, for example, as follows.

First, processing a thin metal plate prepares an intermediate product 62 of the current collecting lead 34 formed of a thin plate having a substantially H-shaped in a plan view, as shown in FIG. 8. In the intermediate product 62, the long-size portions positioned on both side parts are a first half body part schedule region 70 to be the first half body part 52 and a second half body part schedule region 72 to be the second half body part 54. The regions continuing to the inside of the first half body part schedule region 70 and the second half body part schedule region 72 are side wall schedule regions 74 and 76 to be the side walls 42 and 44. A region sandwiched between the side wall schedule region 74 and the side wall schedule region 76 is a bottom wall schedule region 78 to be the bottom wall 36.

In the intermediate product 62, the lead protrusions 58 are provided at predetermined positions on both ends of the first half body part schedule region 70 and the second half body part schedule region 72 by punch press processing. The portion of the lead protrusion 58 is melted by resistance-welding to form the welded part.

Further, in the intermediate product 62, the first semicircular notch 55 and the second semicircular notch 57 are provided at the centers of the side edges of the first half body part schedule region 70 and the second half body part schedule region 72 by punching.

Further, in the intermediate product 62, the circular bottom wall through hole 51 is provided at the center of the bottom wall schedule region 78.

There are assumed four bottom wall welding schedule parts 56, to be in contact with the current collector protrusion 31 of the positive electrode current collector 128, and in which the welded parts are to be formed by resistance-welding, around the bottom wall through hole 51 in the bottom wall schedule region 78, and the bottom wall welding schedule part 56 is represented by a virtual circle.

In the intermediate product 62 obtained by applying the above-described pressing and punching, the current collecting lead 34 as shown in FIG. 6 and FIG. 7 is formed, by bending a portion of a bending imaginary line 80 assumed between the first half body part schedule region 70 and the side wall schedule region 76, a bending imaginary line 82 assumed between the side wall schedule region 76 and the bottom wall schedule region 78, a bending imaginary line 84 assumed between the bottom wall schedule region 78 and the side wall schedule region 74, and a bending imaginary line 86 assumed between the side wall schedule region 74 and the second half body part schedule region 72. It is preferable that the side wall schedule regions 74 and 76 are processed into a curved shape. Further, the first half body part 52 and the second half body part 54 are connected with their tip end portions abutted against each other, and the top wall 50 including the top wall through hole 59 is formed.

Next, an example of an assembly procedure of the battery 103 will be described.

First, the electrode group 104 as described above is prepared. Then, after the negative electrode current collector is joined to the other end side of the electrode group 104, the electrode group 104 is housed in the outer can 2. Then, the negative electrode current collector is resistance-welded to the bottom wall of the outer can 2.

Next, the positive electrode current collector 128 is mounted on one end side of the electrode group 104, and the positive electrode connection edge part 32 and the positive electrode current collector 128 of the electrode group 104 are resistance-welded. At this time, a current is concentrated at a portion where the burrs of the slits 30 of the positive electrode current collector 128 and the positive electrode connection edge part 32 contact to form the welded part, and the positive electrode connection edge part 32 and the positive electrode current collector 128 of the positive electrode 106 are welded.

Next, a predetermined amount of alkaline electrolyte is injected into the outer can 2. The alkaline electrolyte injected into the outer can 2 is held on the electrode group 104, and most of the alkaline electrolyte is held on the separator 10. The alkaline electrolyte advances an electrochemical reaction (charge and discharge reaction) during charge and discharge between the positive electrode 6 and the negative electrode 8. As the alkaline electrolyte, it is preferable to use an aqueous solution containing at least one of KOH, NaOH and LiOH as a solute.

On the other hand, in a separate process, the inner surface 16b of the lid plate 16 of the sealing body 14 and the top wall 50 of the current collecting lead 34 are resistance-welded to form a composite of the sealing body 14 and the current collecting lead 34. Specifically, a current is concentrated at a portion of the first half body part 52 and the second half body part 54 as the top wall 50 of the current collecting lead 34 where the lead protrusion 58 and the inner surface 16b of the lid plate 16 of the sealing body 14 contact to form the welded part, thereby, the composite is obtained in which the sealing body 14 and the current collecting lead 34 are welded.

Next, the above-described composite is mounted on the top of the positive electrode current collector 128. At this time, the composite is aligned with reference to the slit 30 of the positive electrode current collector 128 so that the bottom wall welding schedule part 56 on the bottom wall 36 of the current collecting lead 34 is in contact with the current collector protrusion 31 of the positive electrode current collector 128. In addition, the insulating gasket 18 is arranged on the outer peripheral edge of the lid plate 16 of the sealing body 14, and the lid plate 16 is positioned at the upper end opening part of the outer can 2 via the insulating gasket 18.

Thereafter, a current is supplied while being pressurized between the positive electrode terminal 22 and the negative electrode terminal of the battery 103 to perform resistance-welding (projection welding). At this time, a current is concentrated at a portion where the current collector protrusion 31 of the positive electrode current collector 128 and the bottom wall welding schedule part 56 on the bottom wall 36 of the current collecting lead 34 contact to form the welded part, and the positive electrode current collector 128 and the bottom wall 36 of the current collecting lead 34 are welded.

After the above welding is completed, the opening edge 17 of the outer can 2 is caulked to seal the opening 3 of the outer can 2. Thus, the battery 103 is formed.

In the battery 103 according to the third embodiment, as shown in FIG. 4, the electrode group 104, the positive electrode current collector 128 and the current collecting lead 34 as a component of the inner housing component are housed in the outer can 2. Each of the electrode group 104, the positive electrode current collector 128, and the current collecting lead 34 is provided with a through hole positioned at a position facing the exhaust hole 19 of the sealing body 14. Specifically, the top wall through hole 59, the bottom wall through hole 51, the current collector center through hole 29 and the electrode group through hole 9 are provided. In the present embodiment, among the through holes, the current collector center through hole 29 is set as the specific through hole. The inner diameter dimension (DC) of the current collector center through hole 29 as the specific through hole is set equal to or less than the inner diameter dimension (DL) of the exhaust hole 19 (DL≥DC). That is, the current collector center through hole 29 has an inner diameter dimension equal to or smaller than that of the exhaust hole 19.

The inner diameter dimension of the top wall through hole 59, the bottom wall through hole 51, and the electrode group through hole 9 except the current collector center through hole 29 as the specific through hole is not particularly limited. In the present embodiment, the inner diameter dimension (DG) of the electrode group through hole 9, the inner diameter dimension (DT) of the top wall through hole 59, and the inner diameter dimension (DB) of the bottom wall through hole 51 is set to a value larger than the inner diameter dimension (DC) of the current collector center through hole 29.

Now, when the obtained battery 103 is overcharged or the like, when it is externally short-circuited, when it is accidentally dropped into a fire, and the like, a gas is abnormally generated in the battery 103 and the battery 103 becomes hot. Then, the resin component contained in the electrode group 104 may be melted to form the melt of the resin component. The melt is mainly formed in the electrode group through hole 9 of the electrode group 104. Further, in the battery in such a situation, the exhaust hole 19 being about to open with the operation of the safety valve causes the flow of gas from the inside of the high-pressure battery to the outside of the battery at a lower pressure than the inside of the battery. The fragments of the melt ride on the flow of the gas, move in the electrode group through hole 9, jump out from the electrode group through hole 9, and travel to the exhaust hole 19 of the lid plate 16. Then, the fragments of the melt adhere to the portion of the exhaust hole 19 to block the exhaust hole 19, and the safety valve may not operate. However, in the battery 103 according to the third embodiment as described above, the inner diameter of the current collector center through hole 29 as the specific through hole in the positive electrode current collector 128 constituting a part of the inner housing component is equal to or less than the inner diameter of the exhaust hole 19, so that the fragments of the melt passing through the current collector center through hole 29 are prevented from spreading in a range wider than the inner diameter of the current collector center through hole 29. For this reason, it is suppressed that the fragments of the melt cover the whole of the exhaust hole 19. That is, blocking of the exhaust hole 19 with the fragments of the melt is prevented. As a result, the inactivation of the safety valve can be avoided, and the safety of the battery 103 can be improved.

As described above, the battery of the third embodiment of the present disclosure is a secondary battery having higher safety than the conventional one.

In the third embodiment of the present disclosure, at least one of the through holes of the component included in the inner housing component is set as the specific through hole. Then, the inner diameter of the specific through hole is set to a size equal to or less than the inner diameter of the exhaust hole 19. Even if the melt of the resin component is formed in the battery and the fragments thereof jump out from the specific through hole and travel to the exhaust hole 19, the fragments do not spread in a range wider than the inner diameter of the specific through hole. So that, even if the fragments reach the exhaust hole 19, they do not reach to cover the whole of the exhaust hole 19. For this reason, inhibition of the operation of the safety valve is prevented, and the rupture of the battery is suppressed.

When, for a preferred aspect, the inner diameter dimension of the exhaust hole 19 is DL, the inner diameter dimension of the top wall through hole 59 is DT, the inner diameter dimension of the bottom wall through hole 51 is DB, and the inner diameter dimension of the current collector center through hole 29 is DC, the relation of DL≥DT≥DB≥DC is satisfied.

In the battery 103 according to the third embodiment, the electrode group through hole 9 of the electrode group 104 may be the specific through hole. In this case, the relation between the inner diameter dimension (DL) of the exhaust hole 19, the inner diameter dimension (DT) of the top wall through hole 59, the inner diameter dimension (DB) of the bottom wall through hole 51, the inner diameter dimension (DC) of the current collector center through hole 29, and the inner diameter dimension (DG) of the electrode group through hole 9 is preferably DL≥DT≥DB≥DC>DG.

Now, in recent years, miniaturization of various devices has progressed, and charge and discharge at a high rate are also required for small devices. Under these circumstances, higher rates of charge and discharge are required for small batteries such as FA-size, AA-size and AAA-size used in small devices.

In these small batteries, it is necessary to miniaturize the components compared with the case of large batteries having an outer diameter of 19 mm or more, such as D-size and C-size. With the miniaturization of components, the melt is more likely to block the exhaust hole. When the exhaust hole is blocked, the safety valve does not operate normally, thereby the battery is more likely to rupture.

Under such circumstances, even if the melt is formed and the melt reaches the exhaust hole, the present disclosure prevents the exhaust hole from being completely covered with the melt, thereby preventing inactivation of the safety valve. So that, in particular, it is effective to suppress the rupture of a small battery excellent in charge and discharge characteristics at a high rate, specifically, a battery having a diameter of less than 19 mm.

EXAMPLE

1. Manufacture of a Battery of a Type with a Current Collection Tab Connected to a Positive Electrode Current Collector (1) Manufacturing Procedure Example 1

(i) Manufacture of Positive Electrode Current Collector

First, a Ni-plated steel plate was prepared in which a thin plate of steel corresponding to a so-called SPCC (cold-rolled steel plate) was Ni-plated to a thickness of 2 μm. The thickness of the Ni-plated steel plate is 0.40 mm. Then, the Ni-plated steel plate was subjected to punching and punch press processing to manufacture the positive electrode current collector 28 for FA size, as shown in FIG. 3, having a decagon shape as a whole, and including the current collector center through hole 29 provided at the center, and the six slits 30 radially extending to surround the current collector center through hole 29. Here, the diameter of the circumscribed circle of the positive electrode current collector 28 is 15.0 mm, and the inner diameter dimension (DC) of the current collector center through hole 29 is 3.0 mm.

(ii) Manufacture of Electrode Group

Next, the positive electrode 106, the negative electrode 108, and the separator 10 used for a general nickel-hydrogen secondary battery were prepared. Each of the positive electrode 106, the negative electrode 108, and the separator 10 has a strip shape. Then, the positive electrode 106 and the negative electrode 108 were stacked with the separator 10 interposed therebetween. Subsequently, the positive electrode 106 and the negative electrode 108 stacked with the separator 10 interposed were wound around the winding core and wound in a spiral shape. Thereby, the electrode group 104 for FA size was formed. During winding, the positive electrode 106 and the negative electrode 108 were disposed to be slightly deviated from each other in the direction along the axis of the electrode group 104, and the separator 10 was disposed at a predetermined position between the positive electrode 106 and the negative electrode 108. In this state, winding operation was performed to obtain a cylindrical electrode group 104. As for the obtained electrode group 104, in one end side of the electrode group 104, the positive electrode connection edge part 32 of the positive electrode 106 protrudes from the adjacent negative electrode 108 via the separator 10, and in the other end side of the electrode group 104, the negative electrode connection edge part of the negative electrode 108 protrudes from the adjacent positive electrode 106 via the separator 10. Further, at the center of the electrode group 104, the electrode group through hole 9 formed by extracting the winding core is formed.

Here, the obtained electrode group 4 as a whole has an outer diameter of 17.0 mm, a height of 61.5 mm, and an inner diameter dimension (DG) of the electrode group through hole 9 of 3.4 mm.

(iii) Battery Assembly

Next, a negative electrode current collector for FA size formed of a disk-shaped thin plate of Ni-plated steel having a diameter of 16.0 mm and a thickness of 0.4 mm was prepared. The negative electrode current collector was welded to the negative electrode connection edge part of the electrode group 104.

Next, the electrode group 104 to which the negative electrode current collector was welded was housed in the bottomed cylindrical outer can 2. Then, the inner surface of the bottom wall of the outer can 2 was welded to the negative electrode current collector.

Next, the positive electrode current collector 28 was mounted on the upper end part of the electrode group 104, and the positive electrode connection edge part 32 of the electrode group 104 and the positive electrode current collector 28 were resistance-welded.

Further, the other end of the current collection tab 35 formed of a metal strip was resistance-welded to a predetermined position on the surface of the positive electrode current collector 28 opposite to the electrode group 104.

Next, a predetermined amount of an alkaline electrolyte containing KOH as a solute was injected into the outer can 2.

Thereafter, one end of the current collection tab 35 was resistance-welded to a predetermined position of the inner surface 16b of the lid plate 16 of the sealing body 14. Here, the exhaust hole 19 of the lid plate 16 included in the sealing body 14 had a circular shape, and the inner diameter dimension (DL) thereof was 3.0 mm.

Subsequently, at the outer peripheral edge of the lid plate 16, the sealing body 14 with the insulating gasket 18 arranged is arranged at the upper end opening part of the outer can 2. Then, the opening edge 17 of the outer can 2 was caulked to seal the opening 3 of the outer can 2. Thus, a battery 102 of FA size as shown in FIG. 2 was assembled. Here, the nominal capacity of the battery 102 is 3750 mAh, and the size of the battery 102 is 66.5 mm in overall height and 17.6 mm in outer diameter.

By repeating the above procedure, five batteries 102 were manufactured.

Now, the ratio of the inner diameter dimension (DL) of the exhaust hole 19 to the inner diameter dimension (DC) of the current collector center through hole 29 was determined. The results are shown in Table 1 as the through hole inner diameter ratio. It means that when the value of the through hole inner diameter ratio is 100%, the inner diameter dimension (DC) of the current collector center through hole 29 and the inner diameter dimension (DL) of the exhaust hole 19 are the same, when it is less than 100%, the inner diameter dimension (DC) of the current collector center through hole 29 is larger than the inner diameter dimension (DL) of the exhaust hole 19, and when it exceeds 100%, the inner diameter dimension (DC) of the current collector center through hole 29 is smaller than the inner diameter dimension (DL) of the exhaust hole 19.

(iv) Initial Activation Process

The charge and discharge cycle were repeated three times as one cycle of charge and discharge work in which, in a 25° C. environment, after charged for 16 hours with a charge current of 0.1 It, the obtained battery 102 was discharged with a discharge current of 0.2 It until the battery voltage reached 1.0 V. Thus, an initial activation process was performed to make the battery 102 in a usable state.

Examples 2 to 9 and Comparative Examples 1 to 4

Five batteries were manufactured for each Example in the same manner as in Example 1, except that the inner diameter dimension (DL) of the exhaust hole 19 was set as shown in Table 1, and the batteries were made to be usable state. In Example 9, the sealing body could not be formed, and the battery could not be manufactured.

(2) Battery Evaluation (i) Burner Combustion Test

The battery of each of the conditions of Examples 1 to 8 and Comparative Examples 1 to 4 having been subjected to the initial activation process was subjected to a charging operation to be made in a fully charged state.

Five batteries of each of Examples 1 to 8 and Comparative Examples 1 to 4 in a fully charged state were prepared, respectively. To the batteries, a flame of a gas burner was applied to the circumference wall surface of the outer can, and was held for 60 seconds to heat them, thereby, a combustion test was conducted. Thereafter, each battery was naturally cooled to room temperature (25° C.).

Each battery after natural cooling was checked to see whether it had ruptured. The number of batteries in which the rupture occurred was counted, and the number of raptured batteries in five batteries under each condition is shown in Table 1.

TABLE 1

| | Inner diameter dimension of exhaust hole (DL) [mm] | Inner diameter dimension of current collector center through hole (DC) [mm] | Through hole inner diameter ratio [%] | Number of ruptures in 5 batteries [pcs.] |
|---|---|---|---|---|
| Example 1 | 3.0 | 3.0 | 100 | 0 |
| Example 2 | 3.3 | 3.0 | 110 | 0 |
| Example 3 | 3.6 | 3.0 | 120 | 0 |
| Example 4 | 3.9 | 3.0 | 130 | 0 |
| Example 5 | 4.2 | 3.0 | 140 | 0 |
| Example 6 | 4.5 | 3.0 | 150 | 0 |
| Example 7 | 4.8 | 3.0 | 160 | 0 |
| Example 8 | 5.1 | 3.0 | 170 | 0 |
| Example 9 | 5.4 | 3.0 | 180 | Sealing body cannot be manufactured |
| Comparative example 1 | 1.8 | 3.0 | 60 | 2 |
| Comparative example 2 | 2.1 | 3.0 | 70 | 2 |
| Comparative example 3 | 2.4 | 3.0 | 80 | 1 |
| Comparative example 4 | 2.7 | 3.0 | 90 | 1 |

(ii) Consideration

In the batteries of Comparative Examples 1 to 4, rupture has occurred. It is considered that the fragments of the melt generated by melting the resin component in the battery by the heat of the flame of the gas burner covered the whole exhaust hole, so that the safety valve did not operate normally, thereby causing the rupture. In particular, the heat of the flame of the gas burner also causes an increase in the gas pressure in the battery, therewith a gas flow occurs where the safety valve is about to open. In the flow of the gas, the fragments of the melt jump out from the electrode group through hole of the electrode group 104 and travel to the exhaust hole through the current collector center through hole of the positive electrode current collector. In the batteries of Comparative Examples 1 to 4, since the inner diameter dimension of the current collector center through hole of the positive electrode current collector is larger than the inner diameter dimension of the exhaust hole, the fragments of the melt jumping out from the current collector center through hole spread over a wider range than the exhaust hole. For this reason, the whole exhaust hole is covered with the fragments of the melt. As a result, it is considered that the safety valve did not operate and the battery ruptured. In contrast, in the batteries of Examples 1 to 8, no rupture occurred. The fragments of the melt are considered to travel to the exhaust hole similar to Comparative Examples 1 to 4. However, in the batteries of Examples 1 to 8, since the inner diameter dimension of the current collector center through hole of the positive electrode current collector is equal to or less than the inner diameter dimension of the exhaust hole, the fragments of the melt jumping out from the current collector center through hole spread only to a narrower range than the exhaust hole. For this reason, it is suppressed that the whole exhaust hole is covered with the fragments of the melt. As a result, it is considered that the safety valve operated normally and battery rupture was prevented.

From the above, making the inner diameter dimension of the current collector center through hole of the positive electrode current collector equal to or less than the inner diameter dimension of the exhaust hole of the lid plate of the battery contributes to improving the safety of the secondary battery.

Here, in Example 9, although the inner diameter dimension of the exhaust hole of the sealing body was set to 5.4 mm, the sealing body could not be manufactured. From this, the inner diameter dimension of the exhaust hole is preferably less than 5.4 mm.

2. Manufacture of a Battery of a Type with a Current Collecting Lead Connected to a Positive Electrode Current Collector (1) Manufacturing Procedure Example 10

(i) Manufacture of Positive Electrode Current Collector

First, a Ni-plated steel plate was prepared in which a thin plate of steel corresponding to a so-called SPCC (cold-rolled steel plate) was Ni-plated to a thickness of 2 μm. The thickness of the Ni-plated steel plate is 0.40 mm. Then, the Ni-plated steel plate was subjected to punching and punch press processing to manufacture the positive electrode current collector 128 for FA size, as shown in FIG. 5, having a decagon shape as a whole, and including the current collector center through hole 29 provided at the center, and the six slits 30 radially extending to surround the current collector center through hole 29, and four current collector protrusions 31. Here, the diameter of the circumscribed circle of the positive electrode current collector 128 is 15.0 mm, and the inner diameter dimension (DC) of the current collector center through hole 29 is 3.0 mm.

(ii) Manufacture of Current Collecting Lead

Next, a Ni-plated steel plate was prepared in which a thin plate of steel corresponding to a so-called SPCC (cold-rolled steel plate) was Ni-plated to a thickness of 2 μm. The thickness of the Ni-plated steel plate is 0.30 mm. Then, the Ni-plated steel plate was subjected to punching and punch press processing to manufacture an intermediate product 62 of a substantially H-shaped current collecting lead, as shown in FIG. 8. In the intermediate product 62, a circular bottom wall through hole 51 is provided at the center, and a first semicircular notch 55 and a second semicircular notch 57 are provided at predetermined positions of a first half body part schedule region 70 and a second half body part schedule region 72 on both sides. In addition, the lead protrusions 58 are formed at predetermined positions of the first half body part schedule region 70 and the second half body part schedule region 72.

Now, with reference to FIG. 8, the dimension of each part of the intermediate product 62 will be described below.

A side wall maximum width W1 is 8.0 mm, a side wall length L1 is 3.5 mm, and an inner diameter dimension DB of the bottom wall through hole 51 is 3.0 mm. A length L3 in the direction shown by the arrow X of the bottom wall schedule region 78 is 6.5 mm, a length L4 in the direction shown by the arrow X in the first half body part schedule region 70 and the second half body part schedule region 72 is 3.25 mm, a length W2 in the direction shown by the arrow Y of the bottom wall schedule region 78 is 7.5 mm, and a length W3 in the direction shown by the arrow Y in the first half body part schedule region 70 and the second half body part schedule region 72 is 12.5 mm. The radius of each of the first semicircular notch 55 and the second semicircular notch 57 is 1.5 mm. That is, an inner diameter dimension DT of the top wall through hole 59 is 3.0 mm.

Next, the intermediate product 62 was bent at the portion of the bending imaginary lines 80, 82, 84 and 86 to form current the collecting lead 34 as shown in FIG. 6 and FIG. 7.

(iii) Manufacture of Electrode Group

Next, the positive electrode 106, the negative electrode 108, and the separator 10 used for a general nickel-hydrogen secondary battery were prepared. Each of the positive electrode 106, the negative electrode 108, and the separator 10 has a strip shape. Then, the positive electrode 106 and the negative electrode 108 were stacked with the separator 10 interposed therebetween. Subsequently, the positive electrode 106 and the negative electrode 108 stacked with the separator 10 interposed were wound around the winding core and wound in a spiral shape. Thereby, the electrode group 104 for FA size was formed. During winding, the positive electrode 106 and the negative electrode 108 were disposed to be slightly deviated from each other in the direction along the axis of the electrode group 104, and the separator 10 was disposed at a predetermined position between the positive electrode 106 and the negative electrode 108. In this state, winding operation was performed to obtain a cylindrical electrode group 104. As for the obtained electrode group 104, in one end side of the electrode group 104, the positive electrode connection edge part 32 of the positive electrode 106 protrudes from the adjacent negative electrode 108 via the separator 10 and in the other end side of the electrode group 104, the negative electrode connection edge part of the negative electrode 108 protrudes from the adjacent positive electrode 106 via the separator 10. Further, at the center of the electrode group 104, an electrode group through hole 9 formed by extracting the winding core is formed.

Here, the obtained electrode group 104 as a whole has an outer diameter of 17.0 mm, a height of 61.5 mm, and the inner diameter dimension (DG) of the electrode group through hole 9 of 3.4 mm.

(iv) Battery Assembly

Next, the negative electrode current collector for FA size formed of a disk-shaped thin plate of Ni-plated steel having a diameter of 16.0 mm and a thickness of 0.4 mm was prepared. The negative electrode current collector was welded to the negative electrode connection edge part of the electrode group 104.

Next, the electrode group 104 to which the negative electrode current collector was welded was housed in the bottomed cylindrical outer can 2. Then, the inner surface of the bottom wall of the outer can 2 was welded to the negative electrode current collector.

Next, the positive electrode current collector 128 was mounted on the upper end part of the electrode group 104, and the positive electrode connection edge part 32 of the electrode group 104 and the positive electrode current collector 128 were resistance-welded.

Next, a predetermined amount of an alkaline electrolyte containing KOH as a solute was injected into the outer can 2.

Next, the current collecting lead 34 manufactured as described above was resistance-welded to the sealing body 14 to form a composite of the sealing body 14 and the current collecting lead 34. Specifically, a current was concentrated at the portion of the first half body part 52 and the second half body part 54 as the top wall 50 of the current collecting lead 34 where the lead protrusion 58 and the inner surface 16b of the lid plate 16 of the sealing body 14 contact to form the welded part, thereby the composite in which the sealing body 14 and the current collecting lead 34 were welded was obtained. Here, the exhaust hole 19 of the lid plate 16 included in the sealing body 14 has a circular shape, and the inner diameter dimension (DL) thereof was set to 3.0 mm.

The obtained composite was mounted on the top of the positive electrode current collector 128. At this time, the composite was aligned with reference to the slit 30 of the positive electrode current collector 128 so that the bottom wall welding schedule part 56 on the bottom wall 36 of the current collecting lead 34 and the current collector protrusion 31 of the positive electrode current collector 128 contact. In addition, the insulating gasket 18 was arranged on the outer peripheral edge of the lid plate 16 of the sealing body 14. As a result, the lid plate 16 is positioned at the upper end opening part of the outer can 2 via the insulating gasket 18.

Thereafter, a current was supplied while being pressurized between the positive electrode terminal 22 and the negative electrode terminal of the sealing body 14 to perform resistance-welding (projection welding). At this time, a current was concentrated at a portion where the current collector protrusion 31 of the positive electrode current collector 128 and the bottom wall welding schedule part 56 on the bottom wall 36 of the current collecting lead 34 contact to form the welded part, the positive electrode current collector 128 and the bottom wall 36 of the current collecting lead 34 were welded.

After the welding as above was completed, the opening edge 17 of the outer can 2 was caulked to seal the opening 3 of the outer can 2. Thus, an FA size battery 103 with a nominal capacity of 3750 mAh was assembled.

Repeating the above procedure manufactured five batteries 103.

(v) Initial Activation Process

The charge and discharge cycle were repeated three times as one cycle of charge and discharge work in which, in a 25° C. environment, after charged for 16 hours with a charge current of 0.1 It, the obtained battery 103 was discharged with a discharge current of 0.2 It until the battery voltage reached 1.0 V. Thus, an initial activation process was performed to make the battery 103 in a usable state.

Examples 11 to 20, Comparative Example 5

Five batteries were manufactured for each Example in the same manner as in Example 10, except that the inner diameter dimension (DL) of the exhaust hole 19, the inner diameter dimension (DT) of the top wall through hole, the inner diameter dimension (DB) of the bottom wall through hole, and the inner diameter dimension (DC) of the current collector center through hole were set as shown in Table 2, and the batteries were made to be usable state. In Example 18, the sealing body could not be formed, and the battery could not be manufactured.

(2) Battery Evaluation (i) Burner Combustion Test

The battery of each of the conditions of Examples 10 to 17, 19, and 20, and Comparative Example 5 having been subjected to the initial activation process was subjected to a charging operation to be made in a fully charged state.

Five batteries of each of Examples 10 to 17, 19 and 20 and Comparative Example 5 in a fully charged state were prepared, respectively. To the batteries, a flame of a gas burner was applied to the circumference wall surface of the outer can, and was held for 60 seconds to heat them, thereby, a combustion test was conducted. Thereafter, each battery was naturally cooled to room temperature (25° C.).

Each battery after natural cooling was checked to see whether it had ruptured or deformed. The number of batteries in which the rupture occurred was counted, and the number of ruptured batteries in five batteries under each condition is shown in Table 2. Further, the number of batteries in which the deformation occurred was counted, and the number of deformed batteries in five batteries under each condition is shown in Table 2.

TABLE 2

| | Inner diameter dimension of exhaust hole (DL) [mm] | Inner diameter dimension of top wall through hole (DT) [mm] | Inner diameter dimension of bottom wall through hole (DB) [mm] | Inner diameter dimension of current collector center through hole (DC) [mm] | Number of ruptures in 5 batteries [pcs.] | Number of deformations in 5 batteries [pcs.] |
|---|---|---|---|---|---|---|
| Example 10 | 3.0 | 3.0 | 3.0 | 3.0 | 0 | 2 |
| Example 11 | 3.3 | 3.3 | 3.3 | 3.3 | 0 | 2 |
| Example 12 | 3.6 | 3.6 | 3.6 | 3.6 | 0 | 2 |
| Example 13 | 3.9 | 3.9 | 3.9 | 3.9 | 0 | 2 |
| Example 14 | 4.2 | 4.2 | 4.2 | 4.2 | 0 | 1 |
| Example 15 | 4.5 | 4.5 | 4.5 | 4.5 | 0 | 1 |
| Example 16 | 4.8 | 4.8 | 4.8 | 4.8 | 0 | 1 |
| Example 17 | 5.1 | 5.1 | 5.1 | 5.1 | 0 | 0 |
| Example 18 | 5.4 | 5.4 | 5.4 | 5.4 | Sealing body cannot be manufactured | Sealing body cannot be manufactured |
| Example 19 | 3.9 | 3.6 | 3.3 | 3.0 | 0 | 0 |
| Example 20 | 4.5 | 4.2 | 3.9 | 3.6 | 0 | 0 |
| Comparative example 5 | 1.8 | 3.0 | 3.0 | 3.0 | 2 | 5 |

(ii) Consideration

In the batteries of Comparative Example 5, rupture and deformation have occurred. It is considered that the fragments of the melt generated by melting the resin component in the battery by the heat of the flame of the gas burner cover the whole exhaust hole, so that the safety valve did not operate normally, thereby causing the rupture and the deformation. In the batteries of Comparative Example 5, the inner diameter dimension (DL) of the exhaust hole is smaller than the inner diameter dimension (DC) of the current collector center through hole. From this, when the inner diameter dimension (DL) of the exhaust hole is smaller than the inner diameter dimension (DC) of the current collector center through hole, the fragments of the melt of the resin component cover the whole exhaust hole, which inhibits the operation of the safety valve.

On the other hand, in the batteries of Examples 10 to 17, 19 and 20 in which the inner diameter dimension (DL) of the exhaust hole is equal to or more than the inner diameter dimension (DC) of the current collector center through hole, no rupture occurs.

From the above, first of all, it is effective for suppressing the rupture of the battery that the inner diameter dimension (DL) of the exhaust hole is equal to or more than the inner diameter dimension (DC) of the current collector center through hole.

Next, taking a closer look at the batteries of Examples 10 to 16, these batteries are not ruptured but deformed. In the batteries of Examples 10 to 16, the inner diameter dimension (DC) of the current collector center through hole and the inner diameter dimension (DL) of the exhaust hole are the same. Moreover, the inner diameter dimension (DT) of the top wall through hole and the inner diameter dimension (DB) of the bottom wall through hole of the current collecting lead are the same as the inner diameter dimension (DC) of the current collector center through hole. That is, there is a relation of DL=DT=DB=DC.

On the other hand, in the batteries of Example 19 and Example 20, neither rupture nor deformation occurs. In the batteries of Examples 19 and 20, the inner diameter dimension (DB) of the bottom wall through hole is larger than the inner diameter dimension (DC) of the current collector center through hole, the inner diameter dimension (DT) of the top wall through hole is larger than the inner diameter dimension (DB) of the bottom wall through hole, and the inner diameter dimension (DL) of the exhaust hole is larger than the inner diameter dimension (DT) of the top wall through hole. That is, there is a relation of DL>DT>DB>DC.

From the above, about the current collector center through hole, the bottom wall through hole of the current collecting lead, the top wall through hole of the current collecting lead and the exhaust hole of the sealing body, the aspect in which the fragments of the melt gradually increase in size along the path toward the exhaust hole can suppress not only rupture of the battery, but deformation, and is more effective and preferable for improving the safety of the battery.

Moreover, about Example 18, although the inner diameter dimension of the exhaust hole of the sealing body was 5.4 mm, the sealing body could not be manufactured. From this, it is preferable that the inner diameter dimension of the exhaust hole, and hence the inner diameter dimension of the current collector center through hole, is less than 5.4 mm. The present disclosure is not limited to the above embodiments and examples, and various modifications are possible. For example, the type of battery is not limited to the nickel-hydrogen secondary battery, but may be a nickel-cadmium secondary battery, a lithium ion secondary battery, or the like.

<Aspects of the Present Disclosure>

A first aspect of the present disclosure is a secondary battery, that includes an outer can also serving as a terminal of one electrode, and having an opening, a sealing body sealing the opening of the outer can, and an inner housing component housed with an electrolyte inside the outer can, wherein the sealing body includes a lid plate fitted to the opening, the lid plate having an exhaust hole at the center, a valve body arranged at a position closing the exhaust hole from the outside of the lid plate, and a cap member also serving as a terminal of the other electrode and electrically connected to the lid plate, the cap member housing the valve body inside with the valve body pressed toward the lid plate, and the inner housing component includes a specific through hole having an inner diameter dimension equal to or less than an inner diameter dimension of the exhaust hole at a position facing the exhaust hole.

A second aspect of the present disclosure is the secondary battery according to the first aspect of the present disclosure described above, wherein the inner housing component includes an electrode group wound in a spiral shape with the one electrode and the other electrode stacked via a separator, and having a cylindrical shape as a whole including an electrode group through hole penetrating a spiral winding center part, and the specific through hole is the electrode group through hole.

A third aspect of the present disclosure is the secondary battery according to the first aspect of the present disclosure described above, wherein the inner housing component includes an electrode group wound in a spiral shape with the one electrode and the other electrode stacked via a separator, and having a cylindrical shape as a whole including an electrode group through hole penetrating the spiral winding center part, and a current collector arranged between the electrode group and the sealing body, the current collector having a current collector center through hole provided at a position corresponding to the electrode group through hole of the electrode group, and the specific through hole is at least any of the electrode group through hole and the current collector center through hole.

A fourth aspect of the present disclosure is the secondary battery according to the first aspect of the present disclosure described above, wherein the inner housing component includes an electrode group wound in a spiral shape with the one electrode and the other electrode stacked via a separator, and having a cylindrical shape as a whole including an electrode group through hole penetrating the spiral winding center part, and a current collector arranged on the top of the electrode group, the current collector having a current collector center through hole provided at a position facing the electrode group through hole of the electrode group, and a current collecting lead arranged between the current collector and the sealing body, the current collecting lead having a top wall located on the side of the sealing body, a bottom wall facing the top wall, and located on the side of the current collector, and a pair of side walls extending between the side edge of the top wall and the side edge of the bottom wall, and facing each other, the top wall including a top wall through hole provided at a position facing the exhaust hole, the bottom wall including a bottom wall through hole provided at a position facing the current collector center through hole, and the specific through hole being at least any of the electrode group through hole, the current collector center through hole, the top wall through hole and the bottom wall through hole.

A fifth aspect of the present disclosure is the secondary battery according to the third aspect of the present disclosure described above, wherein when the specific through hole is the current collector center through hole, an inner diameter dimension of the exhaust hole is DL, and an inner diameter dimension of the current collector center through hole is DC, a relation of DL≥DC is satisfied.

A sixth aspect of the present disclosure is the secondary battery according to the fourth aspect of the present disclosure described above, wherein when the specific through hole is the current collector center through hole, an inner diameter dimension of the exhaust hole is DL, an inner diameter dimension of the top wall through hole is DT, an inner diameter dimension of the bottom wall through hole is DB, and an inner diameter dimension of the current collector center through hole is DC, a relation of DL≥DT≥DB≥DC is satisfied.

Embodiments of the present disclosure being thus described, it will be obvious that the same may be varied in many ways. Such variations are not to be regarded as a departure from the spirit and scope of the disclosure, and all such modifications as would be obvious to one skilled in the art are intended to be included within the scope of the following claims.

What is claimed is:

1. A secondary battery comprising:
   an outer can also serving as a terminal of a first electrode, and having an opening;
   a sealing body sealing the opening of the outer can; and
   an inner housing component housed with an electrolyte inside the outer can,
   wherein:
   the sealing body includes a lid plate fitted to the opening, the lid plate having an exhaust hole at a center, a valve body arranged at a position closing the exhaust hole from outside of the lid plate, and a cap member also serving as a terminal of a second electrode and electrically connected to the lid plate, the cap member housing the valve body inside with the valve body pressed toward the lid plate, and
   the inner housing component includes a specific through hole located coaxially with the exhaust hole and having an inner diameter dimension less than an inner diameter dimension of the exhaust hole at a position facing the exhaust hole;
   wherein:
   the inner housing component includes an electrode group wound in a spiral shape with the first electrode and the second electrode stacked via a separator, and having a cylindrical shape as a whole including an electrode group through hole penetrating a spiral winding center part, a current collector arranged on the top of the electrode group, the current collector having a current collector center through hole provided at a position facing the electrode group through hole of the electrode group, and a current collecting lead arranged between the current collector and the sealing body,
   the current collecting lead has a top wall located on a side of the sealing body, a bottom wall facing the top wall, and located on a side of the current collector, and a pair of side walls extending between a side edge of the top wall and a side edge of the bottom wall, and facing each other,
   the top wall includes a top wall through hole provided at a position facing the exhaust hole,
   the bottom wall includes a bottom wall through hole provided at a position facing the current collector center through hole, and
   the specific through hole is the current collector center through hole, an inner diameter dimension of the exhaust hole is DL, an inner diameter dimension of the top wall through hole is DT, an inner diameter dimension of the bottom wall through hole is DB, an inner diameter dimension of the current collector center through hole is DC, and a relation of DL≥DT≥DB≥DC is satisfied.

* * * * *